R. O. MOURNIAN.
FISH NET AND TRAP.
APPLICATION FILED MAY 6, 1909.
991,740. Patented May 9, 1911.
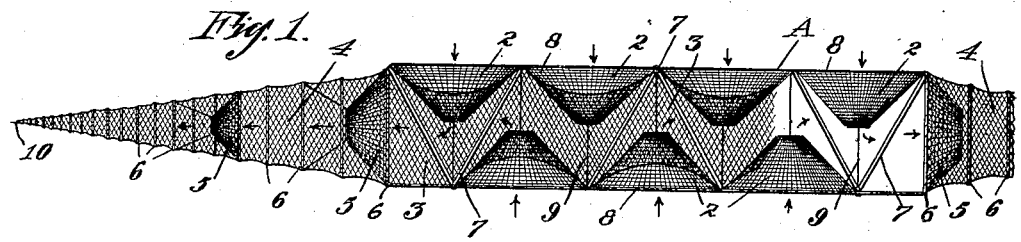
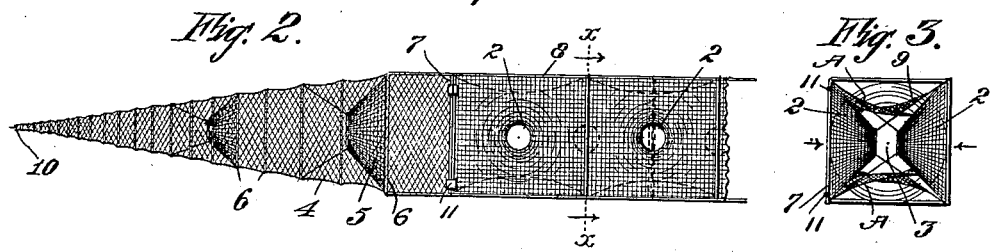
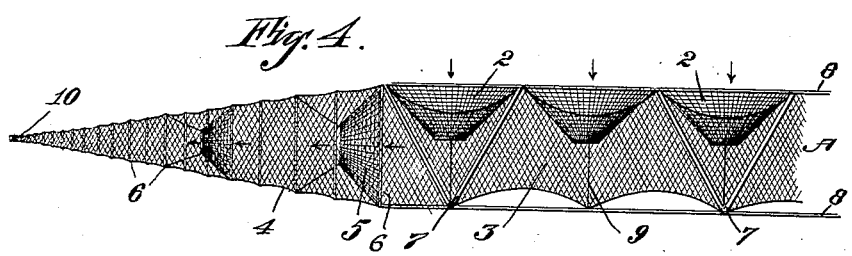
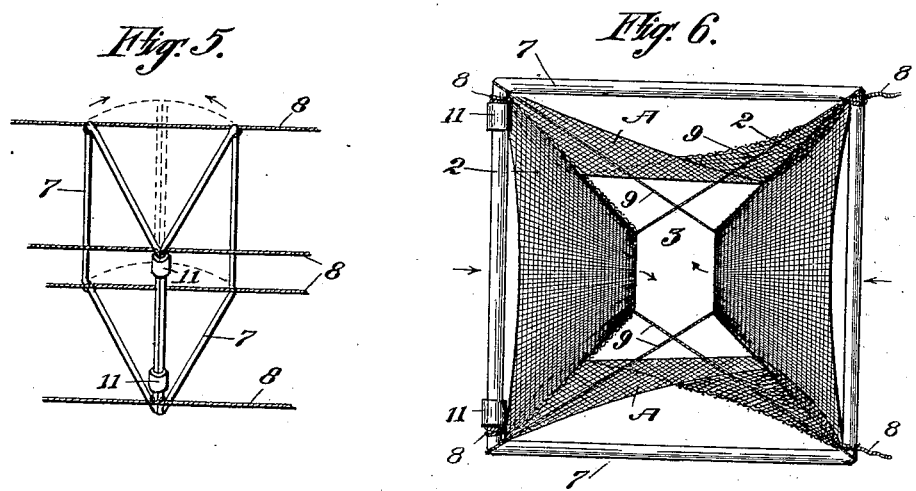
Witnesses:
R. S. Berry
T. N. Fowler
Inventor
Robert O. Mournian
By Geo. H. Strong
His Attorney.

UNITED STATES PATENT OFFICE.

ROBERT O. MOURNIAN, OF BETHANY, CALIFORNIA.

FISH NET AND TRAP.

991,740. Specification of Letters Patent. Patented May 9, 1911.

Application filed May 6, 1909. Serial No. 494,233.

*To all whom it may concern:*

Be it known that I, ROBERT O. MOURNIAN, citizen of the United States, residing at Bethany, in the county of San Joaquin and State of California, have invented new and useful Improvements in Fish Nets and Traps, of which the following is a specification.

My invention relates to nets and traps and pertains especially to a trap for catching fish, but it will be manifest that it is applicable for catching crabs, animals, birds, and even flies and insects.

The invention consists of the parts and the construction and combination of parts as hereinafter more fully described and claimed, having reference to the accompanying drawing, in which—

Figure 1 is a plan view of the invention partially broken away to show the interior construction. Fig. 2 is a side elevation looking into certain of the funnels. Fig. 3 is a sectional elevation on the line X—X, Fig. 2. Fig. 4 represents a modification of the invention. Fig. 5 is a detail of a hinged V frame. Fig. 6 is an enlarged sectional elevation on the line X—X, Fig. 2.

In the embodiment of the invention I provide a network structure, of suitable size, shape and material, so constructed and arranged as to provide a series of funnels 2 on one or both sides of the structure, which funnels open into an inclosed passageway or tunnel 3, which connect with one or more traps 4. As here shown this structure is in the form of an elongated tube approximately square in cross section and having a trap 4 at one end, this trap being made of network and having inwardly opening entrapping funnels 5 by which the egress of the fish or animal entrapped is prevented. The traps 4 are of conical shape and are held distended by suitable means, as the rings or ribs 6, and the entire trap is stretched out across the stream, or otherwise suitably positioned by attaching guy lines or anchors to the extreme ends of the traps 4 so as to stretch the device out into proper shape. The ends of the passageway 3 lead into the traps 4 through the largest entrapping funnels 5, the web inclosing the passage 3 being woven from the square end spreaders 7 to the circular rings or ribs 6 at the mouths of the conical traps 4.

The body of the trap comprises a suitable network suitably stretched across and held in shape by the V-shaped hinged spreaders 7, shown in perspective in Fig. 5, and by the ropes 8 connecting the corners of these spreaders and running the length of the apparatus. These spreaders each comprises a pair of rectangular frames hinged along their vertical side at 11 as shown in Figs. 5 and 6 and arranged in alternate fashion with the apex or hinged portion of one spreader on one side of the trap, and the apex or hinged part of the next succeeding spreader pointing in the opposite direction. The open or spread part of the V hinges hold the top and bottom of one funnel 2 and a half of two adjacent funnels, as shown at the top and bottom of Fig. 1; that is to say, the open part of each hinge has its own funnel, while the opposite side of the trap will have a funnel which is midway between two hinges and is partly supported by each hinge. The small ends of the funnels which project into the tunnel or passageway 3 are stretched and held in shape by a series of cords 9 extending from the rim of the mouth of a funnel to the opposite V frame. The outside inclosing web of the trap is suitably connected to the frames 7 and funnels so as to furnish the desired passageway or tunnel space 3.

In practice the trap is set in the river and stretched and held by suitably connecting anchors or guy lines to the points 10 of the trap end portions 4 with the open mounted funnels 2 pointing in a direction found most desirable for the particular location. A fish or crab passing in through a funnel is entrapped in the passageway 3 and gradually finds its way through the funnel mouths 5 into the trap 4. This network can be easily folded up into a small space by reason of the hinged frames 7, which is a great advantage in devices of this nature. Also it will be noted that the hinged frames 7 on one side are not connected with the hinged frames on the other, but that a section of flexible netting interposes between the succeeding frames so as to enable the device to be easily handled in a boat and for the trap to be folded up gradually. If these hinged frames are all connected together in a chain it would be practically impossible to manipulate them in a small compass provided in an ordinary fishing boat. Manifestly the body of the trap can be made in any suitable shape, round or circular with one or more entrapping wings 4, as desired.

The bottom and the top portions of the tube or tunnel 3 are formed of strips of network A, which extend lengthwise of the tube and are disposed inside of the spreaders 7. The outer edges of the top and bottom strips of network A are secured to the corners of the spreaders 7 with the ropes 8, and are woven into the outer surfaces of the funnels 2 between the spreaders 7, as shown in Fig. 1. The point at which one edge of the network A intersects the surface of a funnel 2 intermediate the spreaders 7, is approximately midway between the outer and inner ends of the funnel and below the corner of the spreader 7 to which the other edge of the net is secured, so that the network A will be inclined from the frame of a spreader on one side to the surface of the funnel on the opposite side, thus giving the network A a zig-zag wave-like appearance. By thus weaving the outer edges of the top and bottom strips of network A into the funnels 2, they serve to spread the funnels 2 and prevent their sagging intermediate their inner and outer ends when the trap is spread into an operative position.

Having thus described my invention, what I claim and desire to secure by Letters-Patent, is—

1. A fish trap comprised of oppositely positioned V shaped hinged spreaders provided with a flexible covering, said covering inclosing a passageway, and open mouthed funnels supported by the spreaders and opening into said passageway.

2. A fish trap comprised of oppositely positioned V shaped hinged spreaders provided with a flexible covering, said covering inclosing a passageway, and open mouthed funnels supported by the spreaders and opening into said passageway, said funnels positioned in alternate arrangement on opposite sides of the trap.

3. A fish trap comprised of oppositely positioned V shaped hinged spreaders provided with a flexible covering, said covering inclosing a passageway, open mouthed funnels supported by the spreaders and opening into said passageway, and said passageway opening into an entrapping chamber, and open mouthed funnels leading from the passageway into the entrapping chamber, said last named funnels adapted to prevent the egress of the entrapped animal.

4. In a trap, the combination with a series of rectangular spreaders arranged in pairs, and the spreaders of each pair hinged along one of their vertical sides to provide V shaped hinged spreaders, a flexible covering for said spreaders, said covering inclosing an entrapping passageway, and open mouthed flexible funnels supported by the spreaders and opening into said passageway.

5. In a trap, the combination of V shaped hinged spreaders arranged alternately with their open portions pointing in opposite directions, ropes connecting the spreaders, a flexible covering for the ropes and spreaders, said covering inclosing an entrapping passageway, said spreaders supporting means which constitute ingress passages to said entrapping passageway.

In testimony whereof I have hereunto set my hand in presence of two subscribing witnesses.

ROBERT O. MOURNIAN.

Witnesses:
CHARLES A. BURFIELD,
CHARLES EDELMAN.

---

Copies of this patent may be obtained for five cents each, by addressing the "Commissioner of Patents, Washington, D. C."